Figure 1:
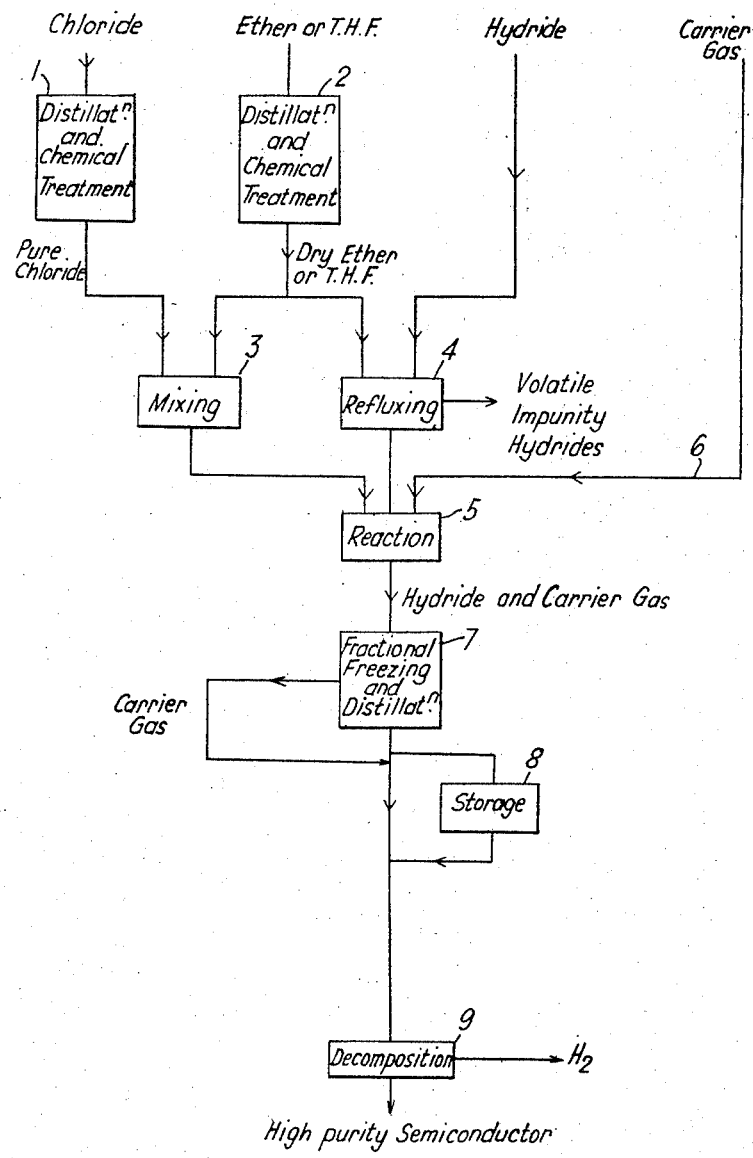

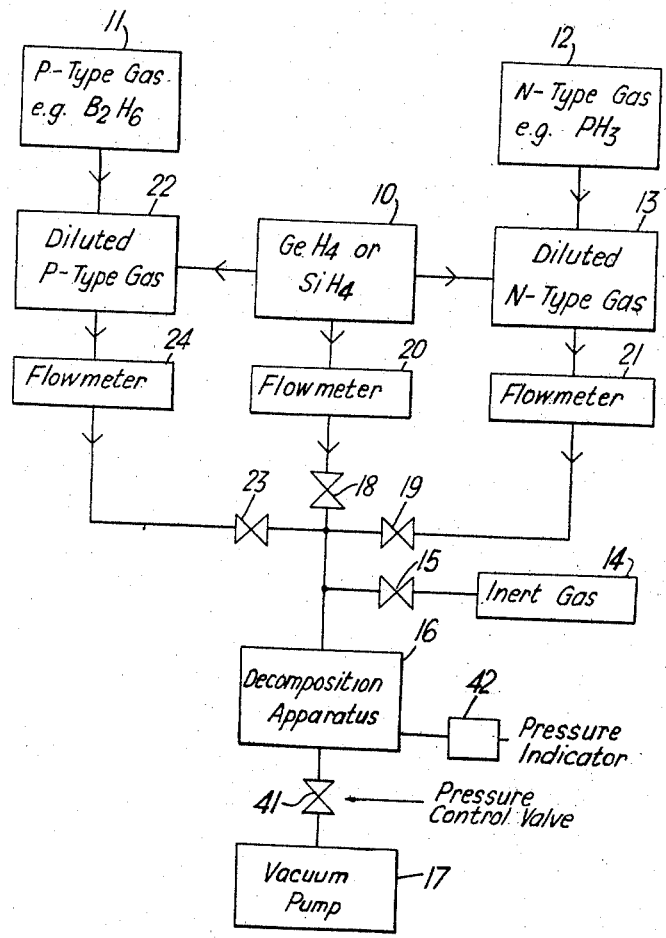

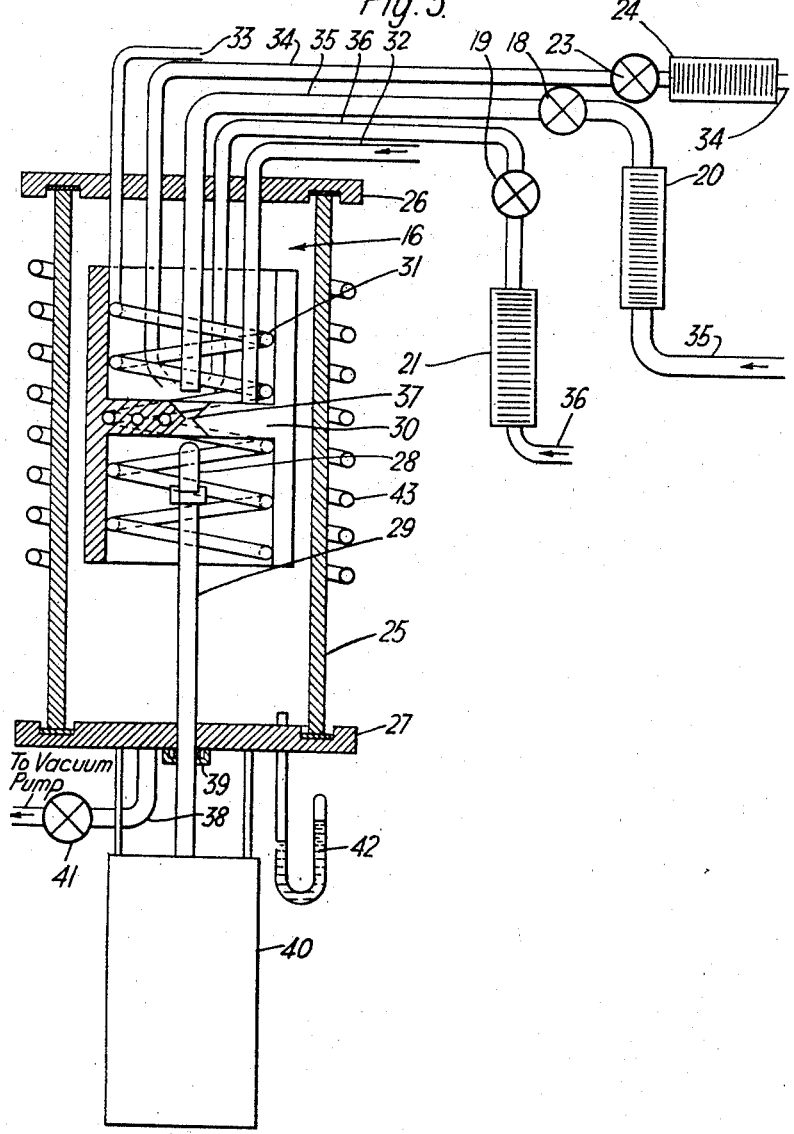

United States Patent Office 2,910,394
Patented Oct. 27, 1959

2,910,394

PRODUCTION OF SEMI-CONDUCTOR MATERIAL FOR RECTIFIERS

Thomas Robertson Scott, George King, and Jack McCreath Wilson, London, England, assignors to International Standard Electric Corporation, New York, N.Y.

Application March 12, 1958, Serial No. 721,034

Claims priority, application Great Britain October 2, 1953

6 Claims. (Cl. 148—1.5)

This application is a continuation-in-part of application Serial No. 457,712, filed September 22, 1954, now abandoned.

This invention relates to a process of manufacture of semi-conductor material for use in rectifiers or crystal amplifiers. In application Serial No. 662,298, filed May 28, 1957 (J. M. Wilson-J. A. Radley-E. D. Neale), there is described and claimed a process of manufacture of substantially pure silicon which comprises passing substantially pure silane (silicon hydride) in a molecular concentration substantially less than normal into a zone heated to a temperature at least equal to the decomposition temperature of silane.

By "molecular concentration" is meant the percentage ratio of the number of silane molecules actually present in one cubic centimetre of the gas to the number which would be present in one cubic centimetre of pure silane gas at atmospheric pressure and at the decomposition temperature. The statement that the "molecular concentration is substantially less than normal" means that the above defined ratio is substantially less than 100 percent.

As described in the said application Serial No. 662,298 such process lends itself readily to the production of a coherent body of silicon and said application also describes and claims a process of manufacture of a coherent body of substantially pure silicon which comprises flowing a stream of substantially pure silane on to the surface of a seed of silicon heated to a temperature above the decomposition temperature of silane and located in an enclosure and adjusting the rate of flow of said silane and the pressure in said enclosure to ensure decomposition of said silane substantially wholly upon the surface of said seed.

Proposals have previously been made to deposit semi-conductor material such as germanium or selenium by the decomposition of a gaseous compound namely, a chloride but in such case a reaction between the chloride and hydrogen is involved. This has two disadvantages. In the first place a corrosive product of the reaction is formed which is liable to attack parts of the apparatus to a sufficient extent to introduce impurities in the material of the semi-conductor. In the second place, no precautions were taken to avoid reaction in the gas phase, whereas for growing a coherent body of semi-conductor material it is important to secure substantially wholly a surface decomposition of the compound of the semi-conductor.

The present invention, therefore in the first place extends the process for manufacture of a coherent body of silicon to apply it to the manufacture of a coherent body of silicon or germanium with a predetermined minor amount of a significant impurity.

Such impurity may be boron, phosphorus, arsenic, antimony or, bismuth.

As is well known, a semi-conductor such as silicon or germanium in its pure intrinsic state has a high resistivity and a low conductivity. By the addition of a very small amount of a significant impurity the resistance is reduced and a conductivity of a p or n type is provided in the semi-conductor, depending upon the significant impurity added. This conductivity may vary within wide limits depending on the amount of impurity added, that is the proportion of impurity to the semi-conductor material. The amount of impurity added is very small, generally being only a fraction of one part to a million parts of the semi-conductor.

All these elements form hydrides which can be prepared by a reaction of lithium aluminium hydride with the corresponding chloride, as described in application No. 662,298 for the production of silicon hydride. Minor modifications in the conditions of such reaction are advisable as will be explained hereinafter. All these hydrides can be readily decomposed by heat and the coherent body can then be formed by ensuring decomposition of the hydride by means of a surface reaction.

In some cases the semi-conductor material may be deposited upon a seed of the same semi-conductor material, in other cases the body upon which the material is deposited may consist of a body of another semi-conductor or in still other cases the deposition may be as in the case of selenium, for example upon a metallic base plate.

According to one feature of the present invention, therefore, a process of manufacture of a coherent body of substantially pure silicon or germanium with a predetermined amount of a significant impurity comprises flowing a stream of a substantially pure hydride of silicon or germanium together with a hydride of the chosen impurity on to a surface located in an enclosure, heating the said surface to a temperature above the decomposition temperature of said hydride, and adjusting the rate of flow of said hydride and the pressure in said enclosure to ensure decomposition of said hydride substantially wholly upon said surface.

The manufacture of pure semi-conductor material is usually the first step in preparing material containing a controlled amount of a significant impurity, and the processes according to the above-mentioned Application No. 662,298 and according to the present invention allow of the direct production of a semi-conductor material containing a controlled amount of impurity by thermal decomposition of the mixed hydrides of the main semi-conductor material and of the impurity.

In the case of either germanium or silicon, the semi-conductor materials which act as significant impurities therein and which can be prepared in the form of hydrides which can be thermally decomposed are mainly boron, gallium, phosphorus, arsenic, antimony and bismuth. Gallium hydride in bulk is a liquid at ordinary temperatures, but sufficient can be carried off in the gaseous state to be mixed with the hydride of germanium or silicon for the purpose of the process according to the present invention.

It should be noted that the hydride of the significant impurity is required to be present in the mixture of hydrides in greater proportion than the proportion of impurity to main semi-conductor material required in the solid body to be produced. This is due to the fact that, owing to the relatively low concentration of the hydride of the significant impurity, 100% decomposition of that hydride is not obtained.

In carrying out this part of the present invention, the conditions of temperature, rate of flow, and pressure are adjusted for optimum rate of growth of the main material, for example, germanium or silicon, and the proportion of hydride of the impurity element is then adjusted to be such as, taking account of the experimentally determined kinetics of the decomposition of this last mentioned hydride, will yield the required proportional content of significant impurity.

The process according to the invention may be further extended to the manufacture of N–P–N or P–N–P junction devices by flowing on to the surface of a body containing the N (or P) impurity a stream of mixed hydrides of the main semi-conductor material and the P (or N) impurity to form a layer of P (or N) type material and thereafter flowing a second stream of mixed hydrides of the main material and the N (or P) impurity.

The process of the present invention may be used to form an alloy of germanium and silicon by causing thermal decomposition of a stream of mixed hydrides of germanium and silicon to occur upon the surface of a seed of germanium or silicon or of the alloy.

The invention will be better understood from the following description of embodiments thereof taken in conjunction with the accompanying drawings in which:

Fig. 1 is a flow sheet showing the steps in the process of manufacturing a semi-conductor material other than silicon according to the invention, Fig. 2 is a flow sheet showing the steps in the process of manufacturing a semi-conductor material containing a significant impurity or impurities, Fig. 3 shows apparatus for depositing semi-conductor material upon a surface.

Referring to the drawings and first to Fig. 1, there is shown therein the steps of preparing a hydride of the required semi-conductor material and of decomposing this hydride.

First, as indicated at 1 the chloride prepared by known methods is purified by fractional distillation and chemical treatment. Ether or tetrahydrofuran for forming a solution of the chloride and of the hydride to be reacted therewith, is also, as indicated at 2, subjected to distillation and chemical treatment. Some of this solvent is used as indicated by step 3 to form a solution of the chloride, and the remainder, as indicated by step 4, is used to form a solution or suspension of the hydride which is refluxed to drive off any impurity hydrides more volatile than the product required.

The materials from steps 3 and 4 are reacted together as shown at 5, a stream of carrier gas as indicated at 6 being used to drive out air from the reaction vessel before the reactants are mixed and to drive out the resultant gaseous hydride.

Minor variations are made in the above steps according to the particular gaseous hydride required to be produced.

For germanium hydride, germanium tetrachloride may be reacted with lithium aluminium hydride as in the case of silicon. For this the solvent used is preferably tetrahydrofuran. The yield of germanium hydride is comparatively low, not exceeding 40% of the theoretical. A higher yield up to 70% is obtained by reacting germanium tetrachloride with sodium borohydride.

For diborane or stibine, the trichloride is reacted with lithium aluminium hydride in diethyl ether and in this case the order of addition of the reactants for step 5 is important if a high yield is desired. The lithium aluminium hydride solution should be added to the chloride solution rather than vice versa.

Phosphine and arsine are prepared by reaction in tetrahydrofuran.

Hydrogen telluride or hydrogen selenide is prepared by addition of the tellurium or selenium tetrachloride to lithium aluminium hydride, both in ether solution. The reaction should take place in the case of hydrogen telluride at low temperatures, e.g. −78° C. to avoid decomposition of the hydrogen telluride by the heat of reaction.

Hydrogen selenide may also be made by reacting aluminium selenide with hydrochloric acid.

The hydride from step 5 is swept away by means of the carrier gas, which is a purified inert gas such as argon, to step 7 which comprises fractional distillation and freezing to purify the hydride. Nitrogen, or nitrogen containing a small proportion of hydrogen, may often be used instead of argon, but in certain cases it is preferable to use a pure inert gas.

The hydride may then usually be stored as indicated at 8. Germane may be stored over water, but other hydrides are soluble and react with water and must be stored in dry condition. Arsine, however, decomposes rapidly at atmospheric pressure and cannot readily be stored.

The purified hydride is then either passed from the storage stage 8 or swept by carrier gas directly from the purification stage into a decomposition zone as indicated at 9 where it is decomposed by heat to deposit the semi-conductor material in a high state of purity upon a surface.

Apparatus for carrying out this decomposition is described hereinafter with reference to Fig. 3.

Fig. 2 is a flow sheet showing the steps for producing a semi-conductor material containing a significant impurity, or successive layers of semi-conductor material containing different significant impurities; for example, for production of an N–P–N junction for silicon or germanium.

A source of germane or silane is shown at 10, and sources of diborane and phosphine at 11 and 12 respectively. Boron is a P-type impurity for germanium or silicon, and phosphorus is an N-type impurity. These are required in very small concentrations (about 1 part in $10^8$ by weight) in the main material.

The production of N-type semi-conductor material will first be described. Phosphine from the source 12 is introduced in small quantity into a chamber at reduced pressure, as shown at 13, to produce a volume of phosphine diluted to about $\frac{1}{1000}$ of full concentration. Germane or silane from the source 10 is then caused to flow into this chamber to restore the pressure to atmospheric.

A tap 15 is opened to cause inert gas from a source 14 to flow through a chamber 16, the gas being drawn out by means of a pump 17. When the chamber 16 is completely filled with the inert gas, taps 18 and 19 are opened so that germane or silane from the source 10 and the mixture of germane or silane and phosphine from 13 are drawn through flow meters 20 and 21 into the chamber 16 where heat is applied to decompose the mixture of hydrides. A pressure control valve 41 is interposed between the pump 17 and chamber 16.

A pressure indicator 42 is connected to the decomposition chamber 16, and a surface on which the "doped" semi-conductor material is to be deposited, such as the surface of a seed of silicon or germanium, is located in this chamber and heated to the required temperature. The pressure in the decomposition chamber 16 is regulated by the valve 41 and the relative rate of flow of the gases from the two sources 10 and 13 regulated by valves 18 and 19 to ensure decomposition of the germane or silane and the phosphine substantially wholly upon the heated surface. The dilution of the phosphine in the stream of gas reaching the surface may be about 1 part in $10^5$ or $10^6$ by weight of germane or silant in order to produce an impurity content of about 1 part in $10^8$ by weight in the "doped" semi-conductor.

A P-type layer upon the N-type semi-conductor thus produced may then be produced by shutting off the valve 19 and repeating the process with diborane from the source 11. A dilute diborane is produced in a chamber 22 and mixed therein with germane or silane from source 10. Valve 23 is then opened to admit the dilute diborane to the decomposition chamber 16 through a flowmeter 24, germane or silane being also drawn in through valve 18, and through the flowmeter 20. Conditions are again adjusted to secure maximum deposition of the P-type semi-conductor resulting from decomposition of the mixed hydrides on the surface of the N-type semi-conductor.

In order to produce a junction of N–P–N kind it is only necessary to shut off the supply of diborane mixed with germane or silane by closure of tap 23 and to resume flow of the mixture of germane or silane and phosphine, the conditions being adjusted back to those previously obtained, if necessary; a layer of N-type semi-conductor is thus deposited on the P-type layer.

A similar process may be used to produce an alloy or compound of two elements, for example, to produce an alloy of germanium and silicon.

Fig. 3 shows a decomposition chamber for depositing semi-conductor material on a surface that can be used for the production of a pure semi-conductor material or for production of a semi-conductor material containing two elements, or for production of successive layers of semi-conductor materials having different constituents.

Parts of the apparatus corresponding to steps in the process shown in Fig. 2 are given reference numerals the same as on that figure.

The decomposition chamber 16 is constituted by a cylinder 25 with end plates 26 and 27 sealed to the cylinder 25 in vacuum tight manner. The body 28 upon whose upper surface the semi-conductor material is to be deposited is supported on a rod 29 and the said surface is heated by inductive coupling to a coil 43 which forms the tuned circuit of an induction heating source generating a frequency of approximately 1 mc./s. The electromagnetic field is concentrated on the surface to be heated by a copper concentrator 30 which is in effect the secondary winding of a transformer of which the coil 43 is the primary winding.

Provision is made for drawing a gaseous compound of a semi-conductor through any one or more of three inlet tubes 34, 35 or 36 furnished with respective flow meters 24, 20 and 21 and inlet valves 23, 18 and 19. Each of the inlet tubes 34, 35, 36 terminates just above an aperture 37 in the concentrator 30. The contour of the aperture 37 is arranged to have a shape which will radiate and/or reflect the maximum heat on to the surface of the body 28 below it, and will assist in the correct flow of a mixture of gases through said aperture on to the said surface.

The winding 43 may be regarded as inducing electric currents in the concentrator 30, which in turn induces currents in the surface of the seed 28, whereby the said surface is heated.

The concentrator is water-cooled by circulating water through a coiled tube 31, water entering at 32 and leaving at 33. It is preferable to cool the concentrator 30 in order that the gas mixture shall not be heated to the decomposition temperature until it comes into contact with the surface of the seed crystal 28, so that no gas phase decomposition occurs, a wholly surface reaction being thereby ensured.

The gaseous compounds are drawn through the aperture 37 by means of a vacuum pump (not shown) connected to an outlet pipe 38 with the interposition of a pressure regulating tap 41. The rod 29 passes through a vacuum seal 39 in the lower plate 27 and is connected to a mechanism 40 which rotates and lowers it at a predetermined rate.

The pressure in the chamber 16 is read on a mercury manometer 42. The valves 23, 18 and 19 can be closed or opened as required and the flow rate of any of one or more streams of gaseous compounds can be adjusted by these valves in conjunction with valve 41 to give the optimum flow rates and pressure for any particular body of semi-conductor material required.

Having given a general account of the process according to the invention, some specific numerical examples of the choice of the conditions of decomposition will now be given.

For the decomposition of germane (GeH$_4$), values within the following ranges can be used:

Pressure in decomposition chamber (mm. Hg) 5 to 120.

Flow rate of germane (litres per hour at S.T.P.) 0.3 to 10.

Decomposition temperature (° C.) 750 to 800.

Growth rate of germanium (grams per hour) 0.013 to 16.

It should, however, be understood that the ranges given above do not necessarily represent the extreme limits of possible values which could be used.

The following Table I gives four specific examples of the choice of the above parameters where it was not desired to produce monocrystalline germanium. No diluting gas was used.

Table I

| Example No. | 1 | 2 | 3 | 4 |
|---|---|---|---|---|
| Pressure (mm. Hg) | 10 | 10 | 15 | 15 |
| Flow rate (litres per hr.) | 5 | 10 | 5 | 10 |
| Temperature (° C.) | 800 | 800 | 780 | 800 |
| Growth rate (gm. per hour) | 8 | 16 | 8.2 | 16 |

Another series of values suitable for producing monocrystalline germanium, starting from a seed crystal, is given in Table II. No diluting gas was used.

Table II

| Example No. | 1 | 2 | 3 | 4 | 5 | 6 |
|---|---|---|---|---|---|---|
| Pressure (mm. Hg) | 16.5 | 24 | 76 | 24 | 78 | 120 |
| Flow rate (litres per hr.) | 0.6 | 0.6 | 0.6 | 0.3 | 0.3 | 0.3 |
| Temperature (° C.) | 760 | 760 | 760 | 760 | 760 | 760 |
| Growth rate (gm. per hour) | 0.22 | 0.28 | 0.8 | 0.12 | 0.3 | 0.44 |

In Table III are given some examples of choice of parameters for producing monocrystalline germanium when a carrier gas is used to dilute the germane. The carrier gas is in this case a mixture of 90% nitrogen and 10% hydrogen, and in the table the percentage of germane in the mixed carrier gas is given.

Table III

| Example No. | 1 | 2 | 3 | 4 | 5 | 6 | 7 |
|---|---|---|---|---|---|---|---|
| Pressure (mm. Hg) | 10 | 100 | 8 | 20 | 55 | 5 | 50 |
| Flow rate (litre per hr.) | 1 | 1 | 1 | 1 | 1 | 1 | 1 |
| Percent GeH$_4$ in carrier gas | 15 | 15 | 19.5 | 19.5 | 19.5 | 18 | 18 |
| Temperature (° C.) | 750 | 750 | 750 | 750 | 750 | 750 | 750 |
| Growth rate (gm. per hr.) | 0.013 | 0.23 | 0.012 | 0.11 | 0.30 | 0.03 | 0.23 |

An example will now be given of the production of germanium to which a small percentage of either phosphorous or boron is added during the decomposition process. In this case the pressure in the decomposition chamber was 10 mm. Hg (no carrier gas), the flow rate was 10 litres per hour, and the decomposition temperature was 800° C. This produced germanium having P type resistivity about 50 ohm-cm. before any significant impurity was added. Phosphine (PH$_3$) or diborane (B$_2$H$_6$) was then added to the germane during the decomposition process in concentration expressed in parts per million (p.p.m.) by weight of the germane, with the results given in Table IV.

Table IV

| Added impurity gas | Value and type of resistivity of germanium |
|---|---|
| 5.6×10$^{-3}$ p.p.m. PH$_3$ | 4 to 7 ohm-cm. (N). |
| 3×10$^{-2}$ p.p.m. PH$_3$ | 0.8 to 1 ohm-cm. (N). |
| 4×10$^{-3}$ p.p.m. B$_2$H$_6$ | 17 to 19.5 ohm-cm. (P). |
| 2.5×10$^{-2}$ p.p.m. B$_2$H$_6$ | 3.1 to 4 ohm-cm. (P). |

While the principles of the invention have been described above in connection with specific embodiments, and particular modifications thereof, it is to be clearly understood that this description is made only by way of

What we claim is:

1. A process of manufacture of a coherent body of semi-conductor material containing a predetermined minor amount of a significant impurity to have the desired conductivity of a chosen type which comprises directing a gaseous stream containing a hydride of a principal material of the class consisting of silicon and germanium and a hydride of a minor impurity material taken from the class consisting of boron, phosphorus, arsenic, antimony, and bismuth, in the proportions to provide the desired conductivity of the chosen type, on to a surface of a seed of semi-conductor material located in an enclosure, heating the said surface to a temperature at least equal to a temperature sufficient to decompose both of said hydrides, and adjusting the rate of flow of said hydrides and the pressure in said enclosure to provide a molecular concentration of said hydrides which is substantially less than the molecular concentration of said hydrides at atmospheric pressure and the decomposition temperature, whereby decomposition of said hydrides substantially wholly upon said surface is assured to produce a coherent body composed of a mixture of said principal material and said minor material.

2. A process of manufacture as claimed in claim 1 which comprises locating the said surface adjacent to a conducting body, heating the said conducting body by induction heating and withdrawing said surface from said conducting body at a rate which maintains the growing surface at a constant distance from said conductive body.

3. A process of manufacture of a semi-conducting body having a portion with a first type of conductivity located between two portions having a second type of conductivity, which comprises directing a first gaseous stream containing a hydride of the main material of the body chosen from the class consisting of germanium and silicon, mixed with a hydride of an impurity material taken from the class consisting of boron, phosphorus, arsenic, antimony and bismuth, and conferring upon said main material of said first type of conductivity on to the surface of a seed of said main material having said second type of conductivity, heating said surface to a temperature sufficient to decompose both of the hydrides, and adjusting the rate of flow of said hydrides and the pressure to provide a molecular concentration of said hydrides which is substantially less than the concentration of said hydrides at atmospheric pressure at said temperature, so as to deposit a mixture of semi-conducting materials on said surface to form a body, thereafter directing a second gaseous stream of a hydride of said main material mixed with a hydride of an impurity taken from the said class and conferring upon said main material said second type of conductivity, and heating the surface of said body to a temperature sufficient to decompose both the hydrides in said second stream upon said surface.

4. A process as claimed in claim 3 further comprising adjusting the rate of flow of each stream of mixed hydrides to ensure decomposition of said hydrides wholly upon the surface exposed to the respective streams.

5. A process as claimed in claim 1 in which the hydride of said impurity is present in greater proportions with respect to the semi-conductor hydride than the proportion of impurity to the semi-conductor material.

6. A process as claimed in claim 5 wherein said impurity hydride is present in an amount between one part in a hundred thousand and one part in one million by weight with respect to the hydride of the semi-conductor to produce a semi-conductor with approximately one part of impurity in one hundred million by weight in the composite semi-conductor.

References Cited in the file of this patent
UNITED STATES PATENTS

| | | |
|---|---|---|
| 2,692,839 | Christensen et al. | Oct. 26, 1954 |
| 2,698,812 | Schladitz | Jan. 4, 1955 |
| 2,701,216 | Seiler | Feb. 1, 1955 |
| 2,763,581 | Freedman | Sept. 18, 1956 |